United States Patent [19]

Hollstein et al.

[11] Patent Number: 4,586,386

[45] Date of Patent: May 6, 1986

[54] METHOD AND APPARATUS FOR DETERMINING POWDER FLOW RATE AND TRANSFER EFFICIENCY OF POWDER SPRAY SYSTEM

[75] Inventors: Thomas E. Hollstein, Amherst; Robert A. Herrig, Elmore; Terrence M. Fulkerson, Parma; John Sharpless, Oberlin, all of Ohio

[73] Assignee: Nordson Corporation, Amherst, Ohio

[21] Appl. No.: 665,934

[22] Filed: Oct. 29, 1984

[51] Int. Cl.[4] .......................... G01F 1/74; G01N 5/00

[52] U.S. Cl. .................................. 73/861.04; 15/409; 73/28; 73/432 R

[58] Field of Search ......... 73/28, 200, 432 V, 432 PS, 73/861, 861.04, 863.21, 863.23, 864.34; 55/270, 468; 239/74; 15/409

[56] References Cited

U.S. PATENT DOCUMENTS

| | | | |
|---|---|---|---|
| Re. 25,555 | 4/1964 | Foster . | |
| 1,078,512 | 11/1913 | Mills . | |
| 1,950,828 | 3/1934 | Thompson . | |
| 2,154,773 | 4/1939 | Reed . | |
| 2,746,078 | 5/1956 | Spurlin . | |
| 3,063,223 | 11/1962 | Arbisi . | |
| 3,452,751 | 7/1969 | Austin, Jr. . | |
| 3,741,001 | 6/1973 | Fletcher | 73/28 |
| 3,743,360 | 7/1973 | Brevko et al. | 73/432 PS X |
| 3,971,096 | 7/1976 | Renholt . | |
| 4,044,423 | 8/1977 | Gaiardelli . | |
| 4,060,001 | 11/1977 | Archerd | 73/864.34 X |

FOREIGN PATENT DOCUMENTS

| | | | |
|---|---|---|---|
| 937312 | 9/1963 | United Kingdom | 15/409 |
| 1008677 | 11/1965 | United Kingdom | 15/409 |

*Primary Examiner*—Charles A. Ruehl

*Attorney, Agent, or Firm*—Wood, Herron & Evans

[57] ABSTRACT

A pneumatic powder collector for determining the transfer efficiency of a powder spray system comprises a funnel for directing powder into a sealed collection chamber. A vacuum is drawn on this chamber by an air flow amplifier having an air flow inlet open to the chamber and an exhaust open to atmosphere. Contained within the chamber there is an air permeable powder collection bag having an inlet open to the funnel so that air entrained powder drawn into the funnel is collected in the bag. The amount of vacuum drawn on the chamber is controlled by a pressure regulator through which high pressure air is supplied to the air flow amplifier so that the vacuum is just sufficient to pull all powder sprayed by a spray gun of the spray system into the chamber without increasing the flow of powder from the gun.

3 Claims, 3 Drawing Figures

METHOD AND APPARATUS FOR DETERMINING POWDER FLOW RATE AND TRANSFER EFFICIENCY OF POWDER SPRAY SYSTEM

This invention relates to a method and apparatus for determining the powder flow rate of a powder spray system and the transfer efficiency of such a system.

Transfer efficiency of a powder spray system is determined by measuring the quantity of powder sprayed from a system over a period of time and comparing that quantity with the total quantity of powder applied to a test panel over the same period of time. Generally, less than 50% of the sprayed powder adheres to the test panel. It is therefore often difficult to determine visually whether the transfer efficiency of a powder spray system is as high as it ought to be, or whether some adjustment to the system is required for more optimal results.

In order to determine the transfer efficiency of a powder spray system, it is necessary to first know the flow rate of powder from the system. In the past, it has been prior art practice to determine the quantity of powder being sprayed from a powder spray system by placing an air permeable bag, as for example a vacuum cleaner bag, over the spray nozzle of a powder spray gun and to collect all of the powder sprayed from the gun over a period of time. By dividing the total quantity of powder sprayed during the test by the time taken for the test, the flow rate of powder from the gun may be determined.

This practice of determining flow rate by collecting the powder in a bag placed over the nozzle of a gun though has been found to be relatively inaccurate because of a back pressure on the pneumatic spray system of the gun created by placement of the powder collection bag over the nozzle of the gun. This back pressure results in a reduced powder flow from the gun over that which is obtained without the presence of the bag over the nozzle.

A powder spray gun is basically a pneumatic conveyor within which powder is transported while entrained in an air stream. The construction of the gun is basically that of a pneumatic conduit having a venturi pumping chamber therein. This venturi pumping chamber is intersected by a powder feed passage through which powder is drawn into the venturi pumping chamber. The construction is such that the greater the air pressure supplied to the venturi pumping chamber of the gun, the greater is the quantity of powder drawn into the pumping chamber and thus emitted from the gun. Any back pressure though caused by the placement of a bag or any other restriction over the nozzle of the gun, results in reduced powder flow from the gun. Consequently, any powder flow test taken while maintaining a back pressure on the nozzle of the gun will necessarily be a false test or a test giving rise to misleading results.

It has therefore been an objective of this invention to provide an improved method and apparatus for accurately measuring the flow rate of powder from a powder spray system.

Still another objective of this invention has been to provide an improved method and apparatus for measuring the transfer efficiency of a powder spray system.

To accomplish these objectives, the invention of this application utilizes a vacuum system located a distance from the nozzle of a spray gun for collecting all of the powder sprayed from the gun without applying a back pressure to the gun. The vacuum though, when applied to the nozzle of the gun, may have the opposite effect of a back pressure, i.e., it may increase the flow of powder from the gun rather than diminish it. Accordingly, it has been another objective of this invention to provide a vacuum system for collecting powder from a powder spray system without applying any more than a minimal vacuum to the nozzle of the gun so as not to change the powder flow characteristics of the gun.

The nature of many powders utilized in powder spray systems is that they are combustible as well as extremely abrasive. Accordingly, it has been another objective of this invention to provide a powder collector which is not subject to wear as an incident to being exposed to the abrasive characteristics of powder collected in the system and which is not subject to fire as a consequence of sparks or heat igniting the combustible powders. To this end, the invention of this application utilizes a powder collector which does not contain any electrical components or any moving parts.

The invention of this application comprises a pneumatic powder collector for collecting air entrained solid particulate powder material from a powder spray gun by locating a suction head near, but spaced from, the nozzle of the gun. According to the practice of this invention, this suction head is in the shape of a funnel having an outlet opening into a sealed collection chamber of the collector. This collection chamber contains a conventional vacuum cleaner bag into which all flow through the suction head is directed. An outlet or exhaust from the collection chamber is open to the inlet of an air flow amplifier. This amplifier is operable, without the presence of any moving parts, to pull air entrained powder through the suction head into the powder collector bag contained in the collection chamber, and to exhaust air from the collection chamber via the air flow amplifier.

The suction at the inlet to the suction head is controlled by controlling the pressure of compressed air supplied to the air flow amplifier. This is accomplished via a pressure regulator and air gauge contained in the compressed air line to the air flow amplifier.

The advantage of this powder collector is that it enables powder to be collected from a powder spray system without applying any back pressure to the powder spray gun and without the application of any substantial suction to the nozzle of the gun which would adversely affect the flow rate of powder through the gun. Since the collector has no moving parts, it is not subject to wear as a result of exposure of the parts to abrasive powder collected from the gun. Nor is it subject to fire resulting from exposure to sparks from electronic components or parts of the collector.

In the use of the collector to determine the flow rate of powder from the gun, the funnel of the suction head of the collector is located sufficiently close to the nozzle of the gun to draw all powder sprayed from the gun into the funnel without sucking powder from the gun and thereby increasing the flow rate of powder from the gun. This powder is collected for a predetermined period of time after which the total quantity of powder collected in the bag of the collector is divided by the time of the collection to determine the flow rate of powder from the gun.

The transfer efficiency of a powder spray system is determined by spraying a test panel with powder sprayed from the gun of the system for a predetermined period of time. By weighing the test panel both before and after the spraying, the total quantity of powder applied to the test panel may be determined. When this quantity of powder is compared to the total quantity of powder sprayed during the test, as determined by the powder collector described hereinabove, the deposition efficiency of the system is accurately determinable.

A primary advantage of this invention is that it enables the flow rate of a powder spray system as well as the deposition efficiency of the system, to be very accurately determined, where heretofore, the collection of the powder adversely affected the flow characteristics of the gun and rendered accurate determination of the flow rate from the system unobtainable.

These and other objects and advantages of this invention will be more readily apparent from the following description of the drawings in which.

Figure 1:
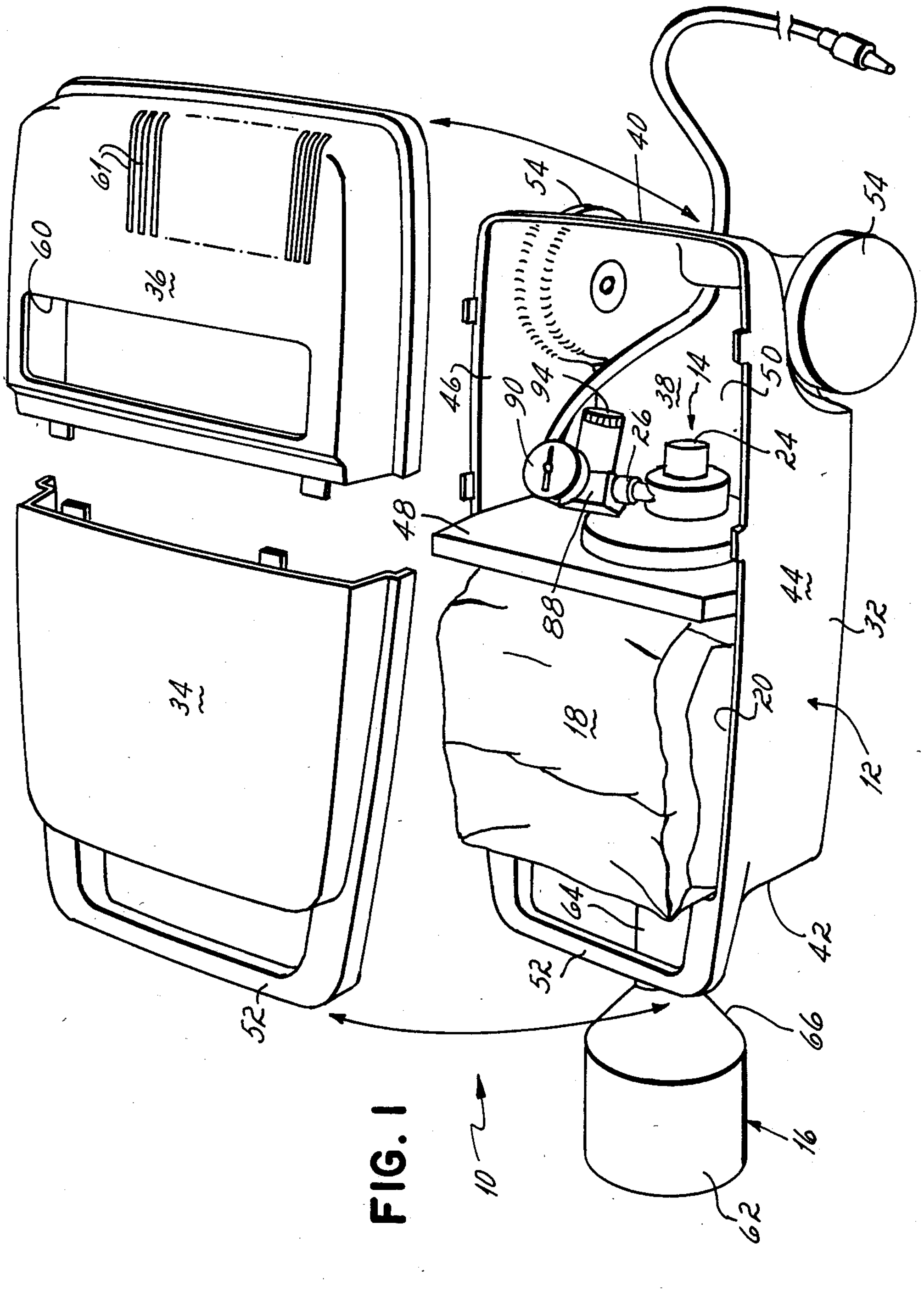
FIG. 1 is a perspective exploded view of a powder collector incorporating the invention of this application.

With reference to FIG. 1 there is illustrated a portable powder collector 10 incorporating the invention of this application. This powder collector 10 comprises a housing 12, a suction head 16, and a powder collection bag 18 contained within a sealed collection chamber 20 of the housing 12. The collector also includes an air flow amplifier 14 contained within the housing. This air flow amplifier has an inlet 22 through which air is drawn into the air flow amplifier and an exhaust outlet 24 through which air is exhausted from the amplifier to atmosphere.

In the use of the powder collector 10, high pressure air is supplied via a supply conduit 26 to the air flow amplifier to create a vacuum at the inlet to the air flow amplifier 14. This vacuum is operative to draw air entrained powder 28 sprayed from a powder spray gun 30 into the suction head 16 and subsequently into the powder collection bag 18 contained within the housing. As explained more fully hereinafter, the quantity of powder collected in this bag within a predetermined time, is utilized to determine the rate of flow of powder from the gun.

The housing 12 comprises a base section 32 and a pair of lid sections 34, 36. The base section comprises a bottom wall 38, a pair of end walls 40, 42, and a pair of side walls 44, 46. A dividing wall 48 extends between the side walls 44, 46 and upwardly from the bottom wall 38 so as to divide the base section 32 of the housing into two chambers, a powder collection chamber 20, and an exhaust air chamber 50. The powder collection chamber is closed by the lid 34 and the exhaust air chamber 50 is closed by the lid 36. Both of these lids are attached to the side and end walls of the base section of the housing by conventional connectors. In the case of the lid 34 over the powder collection chamber, this lid is operative to close the chamber and seal it from air flow except through the suction head 16 and air exhaust port 22 leading to the inlet of the air flow amplifier 14.

Extending from one end of the base section and from one end of the lid 34 there is a portion of a handle 52. Additionally, there are wheels 54 rotatably mounted on the end of the base remote from the handle 52 so as to facilitate movement of the portable collector by grasping the handle and rolling the collector from one site to another.

The lid section 36 which fits over the exhaust air chamber 50 has a rectangular shaped opening 60, as well as a series of parallel slots 61 forming a grill through which the exhaust air chamber 50 is open to atmosphere.

Figure 2:
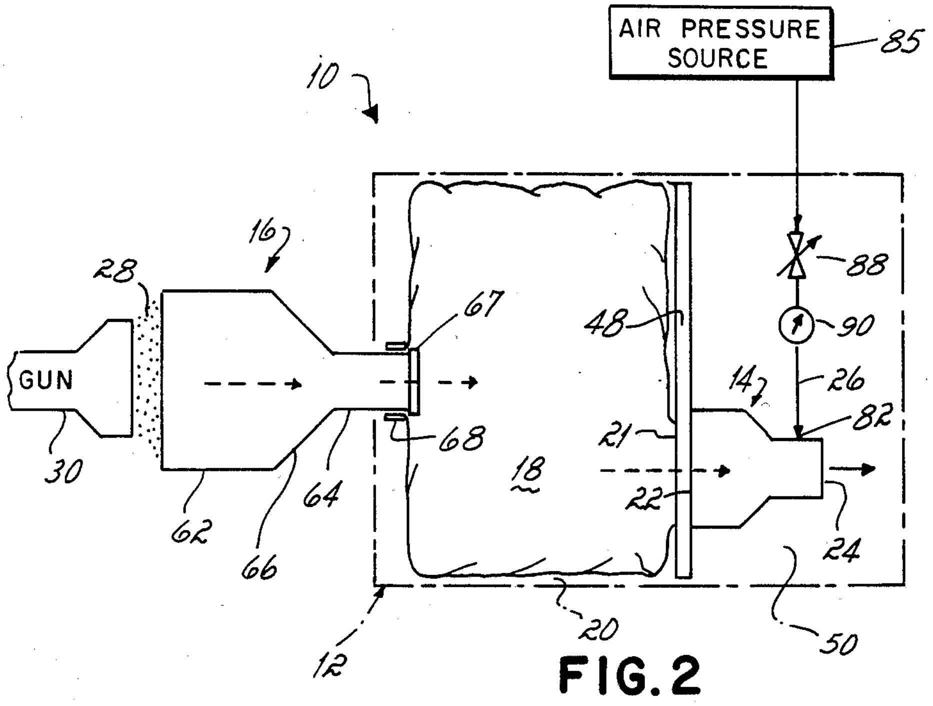
FIG. 2 is a partially diagrammatic illustration of the powder collector of FIG. 1.
Figure 3:
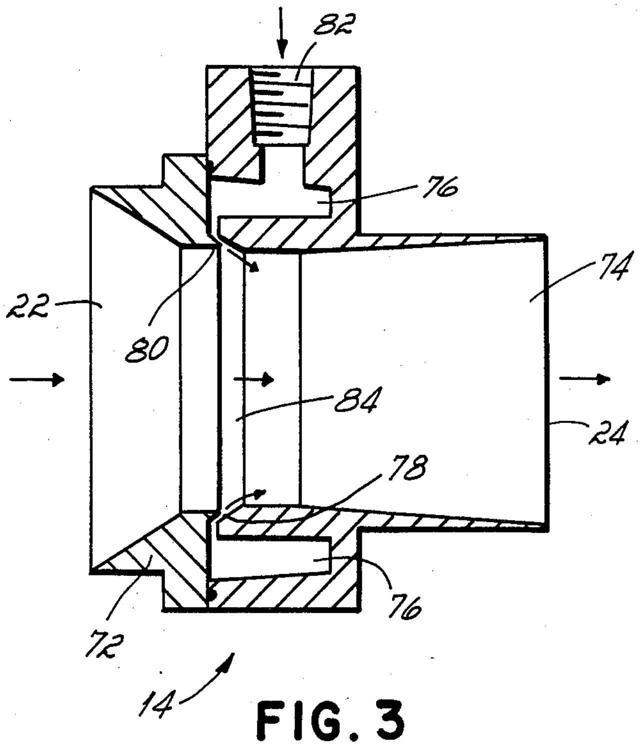
FIG. 3 is a cross sectional view through an air flow amplifier used to create suction in the powder collector of FIG. 1.

With reference to FIG. 2, it will be seen that the suction head 16 is generally funnel shaped, comprising a large diameter outer cylindrical section 62 and a smaller diameter inner section 64 interconnected by a tapered section 66. The smaller diameter cylindrical section 64 extends through the end wall 42 of the base section of the housing 12 and terminates in a collar 67 located internally of the collection chamber 20. This collar receives an inlet opening sleeve 68 of the air powder collecting bag 18 so that any powder which flows through the suction head 16 into the collection chamber 20 is collected within the bag 18. This bag is a conventional air permeable vacuum sweeper bag operable to entrap solid particulate matter therein while still allowing air to flow through the bag.

Air is pulled from the collection chamber 20 by the air flow amplifier 14. The inlet 22 of this amplifier 14 surrounds the exhaust port 21 in the transverse wall 48 of the housing. This inlet 22 is defined by an entrance ring 72 of the air flow amplifier which is sealingly secured to the transverse wall 48. The entrance ring 72 is in turn sealingly secured to the nozzle 74 of the air flow amplifier so as to define an annular air flow chamber 76 therebetween. This chamber opens via a narrow annular orifice 78 into the interior of the nozzle 74. A lip 80 formed as a small inwardly extending flange on the entrance ring 72 is operative to deflect air flow moving from the annular chamber 76 into the nozzle toward the exhaust outlet 24 of the nozzle.

In practice, high pressure air is supplied to the annular chamber 76 of the air flow amplifier via an inlet connected to conduit 26. This high pressure air is directed through the annular orifice 78 in a radially inward direction perpendicular to the air amplifier's center line. At most inlet pressures, the air attains sonic velocity in the course of passing through the nozzle orifice and emerges as a thin sheet of high velocity air which is deflected by the lip 80 toward the exhaust outlet of the amplifier. As the high velocity air from the annular orifice 78 passes through the throat 84 of the amplifier, it collides with air drawn from the collecting chamber 20, causing the air drawn from the collecting chamber 20 to flow toward the exhaust outlet at a relatively high velocity. Thus, a vacuum is created in the throat 84 of the amplifier operable to draw air from the collection chamber 20.

High pressure air is supplied to the inlet port 82 of the air flow amplifier via the conduit 26 which connects the port 82 to a source of compressed air via a pressure regulator 88 and an air pressure gauge 90. The pressure regulator 88 is adjustable via a control knob 94 associated therewith so as to enable the pressure of air supplied from the source to the air flow amplifier to be carefully adjusted. In practice, this pressure is adjusted so as to create a vacuum at the entrance to the suction head 16 just sufficient to pull sprayed powder from the gun 30 into the suction duct without causing increased flow of powder from the gun as a consequence of that vaccum.

The air flow amplifier 14 is a commercially available off-the-shelf item of hardware available from commercial sources. One such amplifier suitable for use in this application is a "Transvector" air flow amplifier manufactured by Vortex Corporation of Cincinnati, Ohio USA.

The powder collector 10 is commonly used to measure the flow rate of powder from a powder spray gun 30. To determine this flow rate, the inlet to the suction head 16 of the gun is placed near the nozzle of the gun so that all air entrained powder 28 ejected from the gun is collected in the suction head 16. The adjustment knob 94 of the pressure regulator 88 is adjusted so as to create a suction at the suction head just sufficient to draw all of the powder into the suction head without creating any excess suction which could cause an increase of powder flow from the gun. With this adjustment properly made, the air flow amplifier 14 is operative to pull air entrained powder through the suction head into the bag 18 in the collection chamber 20 of the housing and to draw all of the air in which that powder is entrained through the bag into the air flow amplifier. In the process, all the powder contained in that air is entrapped within the air permeable bag 18.

In the use of collectors to determine the powder flow rate from gun 30, all of the powder sprayed from the gun 30 during a predetermined time interval, is collected in the collection bag 18. At the end of that time interval the powder collector is removed from in front of the gun and the quantity of powder collected in the bag together with the bag is then weighed. The weight of the bag is then subtracted to determine the weight of the powder. This weight value for the powder is then divided by the time interval required to collect that powder to determine the flow rate of powder from the gun.

One principal purpose of determining the flow rate of powder from the gun is to determine the deposition efficiency of a powder spray system. This is established by utilizing the gun 30 to apply powder to a test panel for a predetermined period of time. The test panel is weighed before and after the application of powder thereto so as to determine the weight of powder applied to the panel during the time period. The total quantity of powder applied to the test panel is then divided by the total quantity of powder sprayed from the gun 30 during the test to establish the deposition efficiency of the system incorporating the gun 30.

While we have described only a single preferred embodiment of our invention, persons skilled in this art will appreciate changes and modifications which may be made without departing from the spirit of our invention. Therefore we do not intend to be limited except by the scope of the following appended claims.

We claim:

1. A method of determining the flow rate of an electrostatic powder spray gun by means of a pneumatic powder collector having a powder collection bag as a portion thereof, which method comprises positioning the inlet opening of the pneumatic powder collector adjacent but spaced from the discharge opening of a powder spray gun so that said powder collector does not place a back pressure upon air entrained powder discharged from said gun, creating a vacuum within said collector bag by supplying high pressure air through a pressure regulator to a vacuum chamber of said pneumatic powder collector, adjusting the pressure of said pressure regulator so as to create a pressure in said vacuum chamber operative to draw all of the air entrained powder emitting from said powder spray gun into said collection bag of said pneumatic powder collector without increasing the flow of powder from the gun, and collecting within said collector bag all of the powder sprayed from said gun during a predetermined timed interval so as to enable the powder flow rate of said gun to be determined by dividing the weight of powder collected in said bag during said time interval by the time of such collection.

2. A method of determining the transfer efficiency of a powder spray system which comprises (a) determining the flow rate from an electrostatic powder spray gun of the system by means of a pneumatic powder collector having a powder collection bag as a portion thereof by (i) positioning the inlet opening of the pneumatic powder collector adjacent but spaced from the discharge opening of a powder spray gun so that said powder collector does not place a back pressure upon air entrained powder discharged from said gun, (ii) creating a vacuum within said collector bag by supplying high pressure air through a pressure regulator to a vacuum chamber of said pneumatic powder collector, (iii) adjusting the pressure of said pressure regulator so as to create a pressure in said vacuum chamber operative to draw all of the air entrained powder emitting from said powder spray gun into said collection bag of said pneumatic powder collector without increasing the flow of powder from the gun, and (iv) collecting within said collector bag all of the powder sprayed from said gun during a first timed interval so as to enable the powder flow rate of said gun to be determined by dividing the weight of powder collected in said bag during said timed interval by the time of such collection, (b) spraying a test panel for a second timed interval with powder sprayed from the gun of the system, (c) weighing the test panel before and after the spraying of the test panel with powder so as to determine the total quantity of powder applied to the test panel, (d) dividing the weight of powder applied to the test panel by the total quantity of powder sprayed during the second timed interval to determine the transfer efficiency of the powder spray system.

3. Apparatus for determing the flow rate of an electrostatic powder spray gun including a pneumatic powder collector having a vacuum chamber and a powder collector bag contained within said vacuum chamber, said pneumatic powder collector having an inlet opening into said bag positionable adjacent but spaced from the discharge opening of a powder spray gun so that said powder collector does not place a back pressure upon air entrained powder discharged from said gun, means for creating a vacuum within said collector bag by supplying high pressure air through a pressure regulator to said collector bag containing vacuum chamber of said pneumatic powder collector, means for adjusting the pressure of said pressure regulator so as to create a pressure in said vacuum chamber operative to draw all of the air entrained powder emitted from said powder spray gun into said collector bag of said pneumatic powder collector without increasing the flow of powder from the gun, and said means for creating a vacuum within said collector bag being operable to collect within said collector bag all of the powder sprayed from said gun during a predetermined timed interval so as to enable the powder flow rate of said gun to be determined by dividing the weight of powder collected in said bag during said time interval by the time of such collection.

* * * * *